United States Patent [19]

Kelly

[11] 3,981,854

[45] Sept. 21, 1976

[54] CHLOROPRENE POLYMER ISOLATION

[75] Inventor: Thomas James Kelly, Metairie, La.

[73] Assignee: E. I. Du Pont de Nemours & Company, Wilmington, Del.

[22] Filed: June 2, 1975

[21] Appl. No.: 582,811

[52] U.S. Cl. .......................... 528/481; 260/63 HA; 528/486; 528/487; 526/295
[51] Int. Cl.² ............................................ C08F 6/22
[58] Field of Search ............ 450/767.5; 260/87.5 R, 260/82.1, 92.3; 528/486

[56] References Cited
UNITED STATES PATENTS

| | | | |
|---|---|---|---|
| 2,187,146 | 1/1940 | Calcott et al. ........................ | 18/57 |
| 3,231,556 | 1/1966 | Hutchinson ........................ | 260/92.3 |
| 3,310,544 | 3/1967 | Aho ................................. | 260/92.3 |
| 3,311,601 | 3/1967 | Conley ............................. | 260/92.3 |

Primary Examiner—Stanford M. Levin

[57] ABSTRACT

Acidification of an alkaline chloroprene polymer latex to a pH of about 5.0–6.5 with a mixture of oxalic acid or a defined sulfonic acid and a weak carboxylic acid prior to polymer isolation by coagulation on a freeze drum eliminates or simplifies the polymer washing step after freeze drum isolation. The proportions of strong and weak acids can be so chosen that the isolated polymer will have the desired alkaline reserve even when the washing step is omitted. The plant production rate can thus be increased. Alternatively, for a given set of washing conditions and film thickness, any alkaline reserve within the desired range can be obtained.

10 Claims, No Drawings

CHLOROPRENE POLYMER ISOLATION

BACKGROUND OF THE INVENTION

This invention relates to an improvement in the process for isolating chloroprene polymers from their alkaline latices. Chloroprene polymers within the scope of this invention include, in addition to homopolymers of chloroprene, also copolymers of chloroprene with up to equal weight of copolymerizable organic monomers.

Polymerization of chloroprene with or without additional monomers usually is carried out in a soap-stabilized, alkaline, aqueous emulsion. Soaps normally used in such polymerizations are the sodium or potassium salts of rosin or modified rosin. The preferred process for isolating the polymer from the latex involves continuous formation of a polymer film by coagulation on a freeze drum, followed by washing of the film and drying, as described by M. A. Youker in *Chemical Engineering Progress*, Vol. 43, No. 8, pp. 391–398 (1947). The process is also described in U.S. Pat. Nos. 2,187,146; 3,310,544; and 3,311,601. For most efficient coagulation at the freeze drum, the latex is made slightly acidic prior to the freeze-drum step. To prevent premature coagulation of the latex during the acidification, small amounts of acid-stable surfactants should be present in the latex. These either are present in the emulsion during the polymerization or are added afterwards to the latex.

The acidification is carried out with weak acids such as acetic acid. Strong mineral acids are avoided because even at high dilution they tend to coagulate the latex. Premature coagulation of the latex causes the formation of large irregular masses of polymer which eventually make further operation of the process difficult or impossible. The pH of the latex at the beginning of the freeze-drum isolation step is about 5.0–6.5.

Acidification of the alkaline latex with acetic acid gives sodium acetate, which is occluded in part in the coagulated polymer film. A certain amount of this sodium acetate is desirable because it improves the storage and aging stability of the polymer. However, too much sodium acetate is undesirable because it reduces the curability of th polymer. The amount of sodium acetate remaining in the polymer is ordinarily referred to in the industry as the polymer's alkaline reserve. This is determined by titrating a tetrahydrofuran solution of the polymer with aqueous hydrochloric acid to a neutral red end point (pH 6.2–6.4) using methylene blue as indicator. The measured value is usually between 0.6 and 2.2 milliequivalents of HCl per 100 g. of polymer.

Because of the criticality of the alkaline reserve, the chloroprene polymer film which leaves the freeze drum is subjected to a washing step. The efficiency of this step is dependent on the film thickness and tends to decrease as the film thickness increases. This problem becomes even more complicated when low alkaline reserve is desired. It can be readily seen that the entire process for the isolation of the chloroprene polymer from its latex can be limited by the ability of the washing system to remove sodium acetate from the polymer film to the desired level in the given time. If this step is slow, the plant output will be limited; but if the efficiency of the washing step could be improved or another method of obtaining the desired alkaline reserve were found, the production rate could be increased.

SUMMARY OF THE INVENTION

According to this invention, it has now been discovered that a proper alkaline reserve can be obtained if the pH of the latex is brought to a pH of about 5.0–6.5 by adding to the latex a combination of a suitable strong acid and a suitable weak acid prior to freeze-drum polymer isolation. Suitable strong acids are oxalic acid and sulfonic acids of the formula $RSO_3H$ where R is (a) a $C_4$–$C_{11}$ alkyl, or (b) an aryl, alkaryl, or aralkyl group in which the sum of the number of any alkyl carbons plus one-half the number of aryl carbons totals 3–11. Suitable weak acids are $C_1$–$C_6$ carboxylic acids having a first ionization constant whose negative logarithm, pKa, at 25°C., is within the range of about 3.5–5.0. The proportion of the strong acid in the acid mixture is 10–80 mole percent, preferably 15–60 mole percent.

DETAILED DESCRIPTION OF THE INVENTION

The chloroprene polymers which can be isolated from their latices according to the process of this invention may be copolymers of chloroprene with olefinic or vinyl comonomers. Suitable comonomers include, for example, styrene, the vinyltoluenes and vinylnaphthalenes, 1,3-butadiene, isoprene, 2,3-dimethyl-1,3-butadiene, 2,3-dichloro-1,3-butadiene, methyl vinyl ether, vinyl acetate, methyl vinyl ketone, acrylic and methacrylic acids, ethyl acrylate, methylmethacrylate, methacrylamide, and acrylonitrile.

Representative suitable sulfonic acids include butanesulfonic acid, hexanesulfonic acid, decanesulfonic acid, benzenesulfonic acid, naphthalenesulfonic acid, toluenesulfonic acid, xylenesulfonic acid, cumenesulfonic acid, butylnaphthalenesulfonic acid, diisopropylnaphthalenesulfonic acid, and benzylsulfonic acid. Toluenesulfonic and xylenesulfonic acids are preferred.

If sulfonic acids are used in which the number of carbon atoms is less than the minimum number specified above, premature coagulation of the latex occurs in the acidification step. Above the upper limit of the indicated range of the number of carbon atoms, the chloroprene polymer latex does not coagulate efficiently at the freeze drum.

When oxalic acid is used as the strong acid, it is recommended that demineralized water be used in the process because of the risk of formation of insoluble salts, such as calcium or magnesium oxalates, which reduce the operable life of the cloth surface of squeeze rolls in one of the subsequent steps.

Suitable weak acids include, for example, acetic acid, propionic acid, formic acid, benzoic acid, and lactic acid. Acetic acid is preferred.

The ratio of strong acid to weak acid is critical. If not enough of the strong acid is used, an insufficient improvement over past methods is obtained. If too much strong acid is used, the isolated polymer does not have sufficient alkaline reserve for good storage stability.

If the strong acid were used alone, for example, the resulting polymer would have little or no alkaline reserve. Such a product tends to scorch (vulcanize prematurely) and has very limited storage stability. The weak acid in the mixture provides alkaline reserve of the product, this alkaline reserve being proportional to the amount of weak acid in the acidifying mixture. By selecting the proper molar ratio of strong or weak acid, one can maintain the alkaline reserve of the polymer product at the desired level, for example, 0.6–2.2 milliequivalents of HCl per 100 g. of polymer. In this manner, the polymer washing step may be omitted or at least considerably simplified.

Since all industrial processes comprise a polymer washing step, and all plants have the necessary equipment, it is expected that the washing step will not be eliminated. However, because of the flexibility which this invention provides of actually tailoring the alkaline reserve according to specific needs by the proper choice and proportions of strong and weak acids in the acidification step, the washing conditions can be maintained constant. In present industrial processes, it is necessary to wash thinner films or to wash at a slower rate if lower alkaline reserve is required, and some low alkaline reserve levels cannot even be reached. The present process does not suffer from these limitations.

The mixture of the weak acid and the strong acid is preferably prepared in advance before it is added to the latex. To avoid local coagulation, it is preferred to use aqueous solutions of the acids, the final mixture being about 2–5N. More dilute solutions can be used but would cause undesirable latex dilution. More concentrated solutions should be used cautiously to avoid partial coagulation of the latex. It also is practical to have present in the acid solution about 1–4%, based on the weight of the solution, of an acid-stable surfactant. Typical acid-stable surfactants include sodium or potassium salts of a formaldehyd-naphthalenesulfonic acid condensate or of dodecylbenzenesulfonic acid. The acid-stable surfactant may also be added in its free acid, rather than salt, form. The presence of surfactants further reduces the risk of local coagulation.

This invention is now illustrated by the following examples of certain representative embodiments thereof, wherein all parts, proportions, and percentages are by weight, unless otherwise indicated. In all examples, the latex was acidified to a pH 5.5.

PREPARATION OF NOEPRENE LATEXES

Latex A is prepared as follows:

A polymer dispersion is made by emulsifying 100 parts by weight of chloroprene, containing in solution 0.6 part of sulfur and 4.0 parts of wood rosin, in a water solution containing 122.5 parts of water, 0.75 part of sodium hydroxide and 0.5 part of the sodium salts of the condensation product of naphthalenesulfonic acids with formaldehyde, serving as the acid-stable dispersing agent. The sodium hydroxide in one phase reacts with the rosin in the other, forming sodium salts of the rosin which act as the main emulsifying agent. The emulsified chloroprene is then polymerized at 40°C. by adding as catalyst, a solution of 0.50 part of potassium persulfate and 0.025 part of the sodium salt of anthraquinone beta-sulfonic acid in 9.47 parts of water. Part of this is added at the start and part during the course of the polymerization, to maintain a fairly uniform rate of polymerization. The course of the polymerization is followed by determining the specific gravity of the dispersion. When this reaches 1.072 at 40°C., corresponding to 90% conversion to polymer, the reaction is "short stopped" by adding 0.45 part of tetraethyl thiuram disulfide dissolved in 2.95 parts of toluene dispersed in 2.22 parts of water by means of 0.30 part of the sodium salts of long chain sodium alkyl sulfates and 0.06 part of the sodium salts of the condensation product of naphthalenesulfonic acids with formaldehyde.

To this polymer dispersion is added 0.19 part of the sodium dibutyl dithiocarbamate in 0.61 part of water. After cooling to 25°C. and aging for 4 hours at that temperature, the dispersion is stripped with steam at reduced pressure in a turbannular flow tube, as described in U.S. Pat. No. 2,467,679, to remove unpolymerized chloroprene and other volatile components.

Latex B is prepared in a manner similar to that of Latex A by polymerizing chloroprene containing 0.15 weight percent of dissolved dodecyl mercaptan at 10°–20°C. in an aqueous emulsion stabilized by the sodium soap derived from 3.5 parts of disproportionated wood rosin per 100 parts of chloroprene.

EXAMPLE 1

(Control, outside the scope of this invention)

An aqueous solution containing 30% of acetic acid and 2% of the sodium salts of the condensation products of naphthalenesulfonic acid and formaldehyde is slowly added to 1450 g. of Latex A. The acid solution is added at a rate of approximately 50 g./min., while the latex is rapidly stirred, until the pH of the latex declines to 5.5.

The acidified latex is then coagulated by freezing in thin layers as described in Example 4 of U.S. Pat. No. 2,187,146, using a freeze drum measuring 13 inches in diameter, and the resulting sheets of polymer and washed with water and dried. The dried polymer has an alkaline reserve of 1.32 meq. of HCl per 100 g. of polymer.

EXAMPLE 2

Acidification of Latex A is carried out with an aqueous solution formed by mixing together 52.5 g. of glacial acetic acid, 23.6 g. of oxalic acid dihydrate, 305 ml. of water, and 7.6 g. of the sodium salts of the condensation products of naphthalenesulfonic acid and formaldehyde. The thickness of the polymer sheets and the conditions of washing are identical to those of Example 1. The dried polymer has an alkaline reserve of 1.11 meq. of HCl per 100 g. of polymer.

EXAMPLE 3

Latex A is acidified with an aqueous solution formed by mixing together 36.5 g. glacial acetic acid, 32.9 g. oxalic acid dihydrate, 425 ml. water, and 10.0 g. of the sodium salts of the condensation products of naphthalenesulfonic acid and formaldehyde. The product, which is washed and dried as in Example 2, has an alkaline reserve of 0.7 meq. of HCl per 100 g. of polymer.

Comparison of Examples 2 and 3 with Example 1 shows that by varying the ratio of oxalic acid to acetic acid in the acidifying solution the alkaline reserve of the product can be varied without altering the conditions of the polymer washing step. This result, furthermore, is achieved without formation of coagulum during addition of the acid solution to the latex.

EXAMPLE 4

(Control, outside the scope of this invention)

Example 1 is repeated using Latex B in place of Latex A. The alkaline reserve of the dried polymer is 2.01 meq. of HCl per 100 g. of polymer.

EXAMPLE 5

Latex B is acidified with a solution formed by dissolving in 375 g. of water 56 g. glacial acetic acid, 50 g. of a mixture of acids consisting of 60 parts of toluenesulfonic acid, and 40 parts of xylenesulfonic acid, and 12.5 g. dodecylbenzenesulfonic acid. No coagulum forms on addition of the acid solution to the latex. The thickness of the coagulated polymer sheet and conditions of washing the sheet are identical to Example 4. Alkaline reserve of the dried polymer is 1.55 meq. of HCl per 100 g. of polymer.

EXAMPLE 6

Latex B is acidified with a solution formed by mixing together 74.8 g. glacial acetic acid, 229 g. of the mixture of toluenesulfonic acid and xylenesulfonic acid described in Example 5, 25 g. dodecylbenzenesulfonic acid, and 612 g. water. During addition of the acid solution to the latex, a small quantity of coagulum forms which amounts to 0.006% of the latex. The polymer is washed and dried as in Example 5. Its alkaline reserve is 0.82 meq. of HCl per 100 g. of polymer.

Comparison of Examples 5 and 6 with Example 4 again demonstrates the control of alkaline reserve without changing the conditions of the washing step.

I claim:

1. In the process of acidifying an alkaline latex of a chloroprene polymer to a pH of about 5.0–6.5 prior to the isolation of said polymer by coagulation on a freeze drum, the improvement of adding to said latex a combination of a strong acid and a weak acid, wherein the strong acid is selected from the group consisting of oxalic acid and sulfonic acids represented by the formula $RSO_3H$, where R is (a) a $C_4$–$C_{11}$ alkyl, or (b) an aryl, alkaryl, or aralkyl group in which the sum of the number of any alkyl carbons plus one-half the number of aryl carbons totals 3–11;

the weak acid is a $C_1$–$C_6$ carboxylic acid having a first ionization constant whose negative logarithm, pKa, at 25°C., is about 3.5–5.0; and the proportion of the strong acid in the combination is about 10–80 mole percent.

2. The improvement of claim 1 wherein the chloroprene polymer is a homopolymer of chloroprene.

3. The improvement of claim 1 wherein the chloroprene polymer is a copolymer of chloroprene with up to its weight of a copolymerizable organic monomer.

4. The improvement of claim 1 wherein the proportion of the strong acid in the combination is 15–60 mole percent.

5. The improvement of claim 1 wherein the alkaline reserve of the resulting polymer isolated by coagulation on a freeze drum is within the range of about 0.6–2.2 milliequivalents of HCl per 100 grams of chloroprene polymer.

6. The improvement of claim 5 wherein the alkaline reserve of the resulting unwashed polymer isolated by coagulation on a freeze drum is within the range of about 0.6–2.2 milliequivalents of HCl per 100 grams of chloroprene polymer.

7. The improvement of claim 1 wherein the strong and weak acids are mixed in advance prior to their addition to the latex.

8. The improvement of claim 7 wherein the mixture is added as an approximately 2–5N aqueous solution.

9. The improvement of claim 8 wherein about 1–4% of an acid-stable surfactant, based on the weight of the solution, is also present in the acid solution.

10. The improvement of claim 1 wherein the strong acid is a mixture of toluenesulfonic acid and xylenesulfonic acid, and the weak acid is acetic acid.

* * * * *